Inventors,
T. Y. Sherwell & R. Pennington

Patented Sept. 29, 1942

2,296,955

UNITED STATES PATENT OFFICE 2,296,955

FLEXIBLE COUPLING

Thomas Yeo Sherwell and Reginald Pennington, Newton Heath, Manchester, England, assignors to Mather & Platt Limited, Newton Heath, Manchester, England, a British company Application October 17, 1940, Serial No. 361,630
In Great Britain November 3, 1939

2 Claims. (Cl. 64—23)

This invention relates to flexible power transmission couplings of the type that permit relative axial movement of the driving and driven members. The invention has particular application to flexible couplings for use with motor-driven centrifugal pumps but is not restricted thereto.

With known flexible couplings of the type in question, any relative axial movement of the two components has restricted freedom due to the friction between the driving surfaces held in contact by the driving torque. This frictional resistance in the axial direction of known couplings may be without importance for some applications but can constitute a disability for others. For example, with an electrically-driven centrifugal pump having the usual hydraulic balance valve for carrying the pump thrust, it is most important that the pump rotor should be free to float in the axial direction and not be restrained by thrust transmitted from the electric motor; conversely, it is desirable that the axial movements of the pump rotor imposed on it by the hydraulic thrust and by the automatic balance valve or by expansion due to temperature rise should not transmit end thrust to the motor bearings.

The object of this invention is to provide an improved construction and arrangement of couplings which whilst allowing the usual degree of non-alignment of the two shafts will nevertheless permit relative axial movement between the two components of the coupling with negligible friction and with the avoidance of wear.

In accordance with our invention each driving or coupling pin which is secured to one half coupling (termed the pin half) and extends into the other half coupling (termed the bush half) has a cross pin therein with a roller or ball bearing therearound at the part which extends into and is free to move in the bush half coupling, the outer race of the bearing riding upon the inner surface of a metal bush which has a sleeve of rubber or other resilient material around it which fits thereon and may be loosely secured in the hole in the bush half coupling into which the driving or coupling pin extends. The external diameter of the outer race of the said bearing is slightly smaller than the bore of the metal bush so that any relative axial movements of the two half couplings will result in the outer race of the roller or ball bearing rolling freely upon the internal surface of the metal bush with negligible friction.

Figure 1:
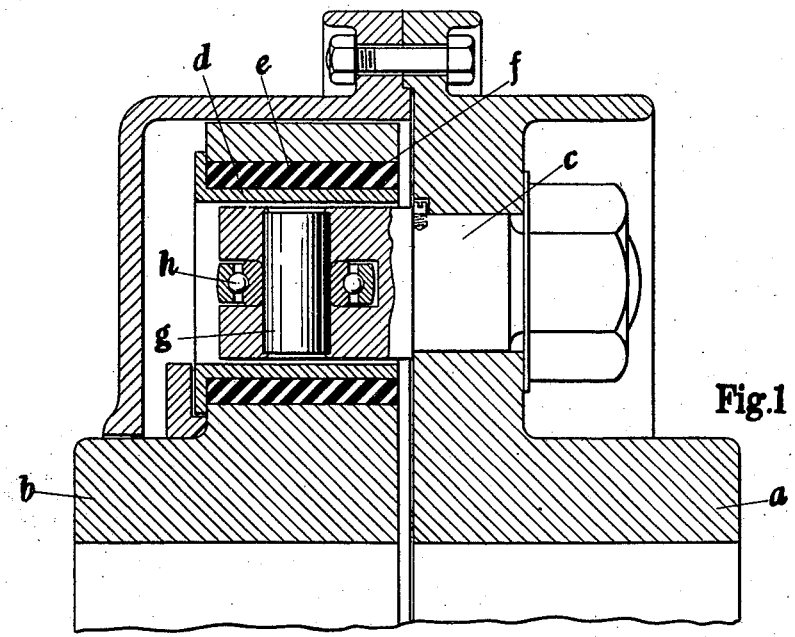
Figure 2:
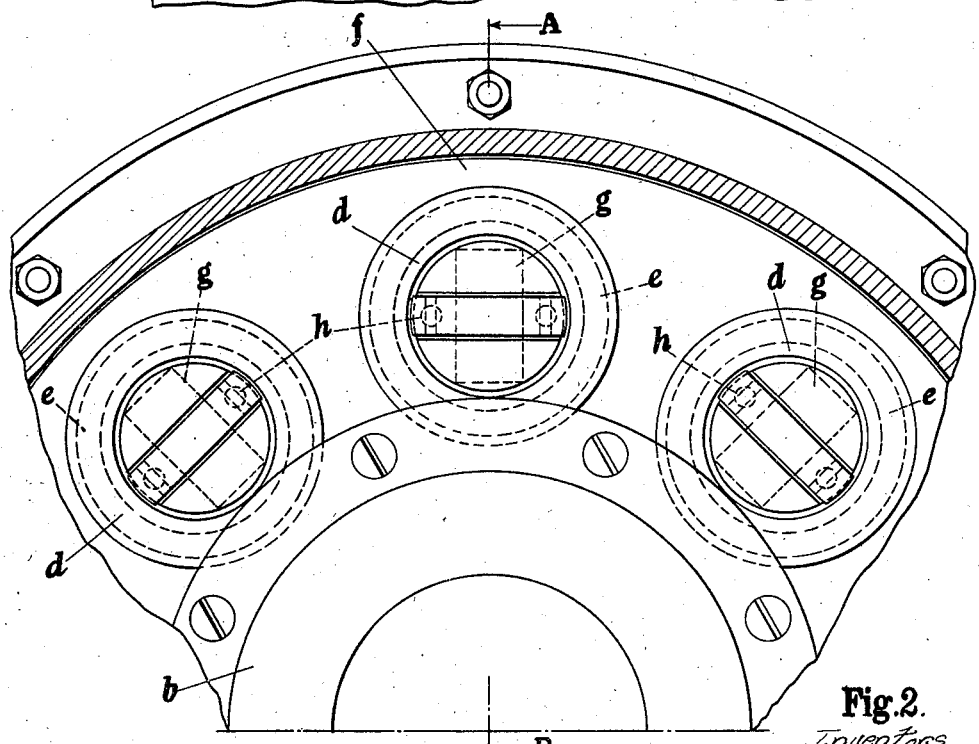

Referring to the accompanying sheet of explanatory drawings:

Figure 1 is a sectional elevation on the line AB of Figure 2, and Figure 2 is an end view looking from left to right in Figure 1 but with the end cover piece in section, showing part of a coupling constructed and arranged in one convenient form in accordance with this invention.

The two parts of the coupling are lettered $a$ and $b$ respectively. The driving pins $c$ are secured and held rigidly in the coupling part $a$ and extend into metal sleeves $d$ which have rubber or other resilient sleeves $e$ between themselves and the walls $f$ of the holes in the coupling part $b$ into which the coupling pins extend.

The end of each coupling pin within a sleeve $d$ has a cross pin $g$ therein and there is a ball bearing $h$ around such cross pin, the inner race of the bearing being a fit on the pin $g$ and the outer race having a slight clearance between itself and the sleeve $d$ so that the outer race can roll freely on the sleeve if there is relative axial movement between the two half couplings.

The rubber or resilient sleeves $e$ provide the necessary freedom for relative movements between the coupling parts in directions other than axial.

With our improvement, we obtain freedom for relative axial movements between the half couplings, with friction so effectively minimised that under no condition of driving torque can appreciable end thrust from the driving side be communicated to the driven side or vice versa, along with the employment of the usual rubber or like sleeves to give freedom for relative movements in directions other than axial.

What we claim is:

1. A flexible shaft coupling for transmitting rotary motion and permitting free axial movement of the shaft sections, of the type in which driving pins extending parallel to the shaft from one coupling member enter resiliently bushed sockets in the other coupling member, having a cross pin mounted in each driving pin, and an anti-friction bearing having an inner and an outer race, mounted on each cross pin in a recess formed in the driving pin, the inner race being a fit on the cross pin and the outer race being adapted to fit with a slight clearance in the socket which receives the driving pin.

2. A flexible shaft coupling for transmitting rotary motion comprising two coupling members, one coupling member having a plurality of openings, a resilient sleeve in each opening and a metal sleeve in each resilient sleeve, a plurality of driving pins projecting from the second coupling member and so located as to enter the metal sleeves in the openings of the first coupling member, a cross pin mounted in each driving pin, an anti-friction bearing having an inner and an outer race mounted on each cross pin in a recess formed in the driving pin, the inner race being a fit on the cross pin and the outer race being adapted to fit with a slight clearance in the metal sleeve.

THOMAS YEO SHERWELL.
REGINALD PENNINGTON.